(12) United States Patent
Rojey et al.

(10) Patent No.: US 7,018,450 B2
(45) Date of Patent: Mar. 28, 2006

(54) NATURAL GAS DEACIDIZING METHOD

(75) Inventors: Alexandre Rojey, Rueil Malmaison (FR); Fabrice Lecomte, Rueil Malmaison (FR); Eric Lemaire, Lyons (FR)

(73) Assignee: Institut Francais du Petrole, Rueil Malmaison Cedex (FR)

( * ) Notice: Subject to any disclaimer, the term of this patent is extended or adjusted under 35 U.S.C. 154(b) by 79 days.

(21) Appl. No.: 10/678,126

(22) Filed: Oct. 6, 2003

(65) Prior Publication Data

US 2004/0065199 A1    Apr. 8, 2004

(30) Foreign Application Priority Data

Oct. 7, 2002    (FR) .................................. 02 12440

(51) Int. Cl.
    *B01D 53/14*    (2006.01)
(52) U.S. Cl. ..................... 95/193; 95/199; 95/209; 95/235; 423/228; 62/625; 62/635
(58) Field of Classification Search ................ 95/181, 95/193, 199, 208, 209, 235; 423/226, 228, 423/229; 62/625, 635
    See application file for complete search history.

(56) References Cited

U.S. PATENT DOCUMENTS

| | | | | |
|---|---|---|---|---|
| 4,710,211 A | * | 12/1987 | Gazzi et al. | 62/634 |
| 4,853,012 A | | 8/1989 | Batteux et al. | 55/44 |
| 4,971,607 A | * | 11/1990 | Gazzi et al. | 95/174 |
| 5,782,958 A | * | 7/1998 | Rojey et al. | 95/192 |
| 6,001,153 A | | 12/1999 | Lebas et al. | 95/181 |
| 6,645,272 B1 | * | 11/2003 | Lemaire et al. | 95/174 |
| 2002/0059865 A1 | * | 5/2002 | Lemaire et al. | 95/174 |
| 2002/0104438 A1 | | 8/2002 | Cadours et al. | 95/235 |

FOREIGN PATENT DOCUMENTS

| | | | |
|---|---|---|---|
| FR | 2 743 083 | | 7/1997 |
| FR | 2 814 379 | | 3/2002 |
| GB | 2087253 A | * | 5/1982 |

OTHER PUBLICATIONS

Preliminary Search Report.

* cited by examiner

*Primary Examiner*—Frank M. Lawrence
(74) *Attorney, Agent, or Firm*—Antonelli, Terry, Stout and Kraus, LLP.

(57) ABSTRACT

The natural gas is successively contacted in column CA with a relatively methanol-rich solvent flowing in through line 4, then with a relatively poor solvent flowing in through line 9. The acid gas-containing solvent recovered through line 3 at the bottom of column CA is expanded through valves V1 and V2 to release acid gases through line 6. A fraction of the expanded solvent is distilled in column CR. The regenerated solvent obtained at the bottom of column CR is sent to the top of column CA through line 9. A second fraction of the expanded solvent is mixed with a solvent drawn off from column CR at an intermediate point between the bottom and the top of this column. This mixture of solvents is sent through line 4 into column CA.

10 Claims, 3 Drawing Sheets

NATURAL GAS DEACIDIZING METHOD

FIELD OF THE INVENTION

The present invention relates to the field of dehydration, deacidizing and stripping of natural gas, using a mixture of water, amine and methanol.

Treating a natural gas requires dehydration, stripping when the gas contains condensable hydrocarbons and deacidizing this gas when the acid gas content is too high.

It is possible to dehydrate and to strip a natural gas by cooling it in the presence of methanol so as to prevent formation of ice or hydrates.

BACKGROUND OF THE INVENTION

It is well-known from the prior art to use chemical solvents such as amines and physical solvents such as methanol or triethylene glycol dimethylether (TEGDME) to carry out the deacidizing operation. Chemical solvents afford the advantage of absorbing acid gases, even in very low proportions in the gas to be treated. They thus allow to obtain high-level specifications for the gas coming from the deacidizing plant, i.e. to obtain a gas containing less than 1% by mole of acid gases. Physical solvents allow to absorb large amounts of acid gases when the acid gas contents are high. However, it is more difficult to obtain high-level specifications for the gas treated with physical solvents. It is also well-known to use a mixture of physical solvent and chemical solvent to treat highly acid gases by means of high-level specifications for the gas treated. It is notably known to use a mixture of amine such as DIPA (diisopropanolamine) or MDEA (methyldiethanolamine) with a relatively heavy physical solvent such as Sulfolane used by the Shell company.

Document FR-2,743,083 provides a natural gas dehydration, deacidizing and stripping method using a mixture of physical and chemical solvents.

The present invention aims to improve the method provided by document FR-2,743,083.

SUMMARY OF THE INVENTION

The present invention thus relates to a method of deacidizing a natural gas containing acid gases wherein the following stages are carried out:
(a) contacting the natural gas with a first solvent containing methanol, water and an amine, obtained in stage e), and with a third solvent containing acid gases obtained in stage b) so as to obtain a methanol-containing gas and an acid gas-containing solvent,
(b) contacting the gas obtained in stage a) with a second solvent containing methanol, water and an amine, obtained in stage d), so as to obtain a gas partly freed of acid gases and the third solvent containing acid gases,
(c) expanding the acid gas-containing solvent obtained in stage a) so as to release acid gases and to obtain a partly regenerated solvent,
(d) distilling in a distillation column a first fraction of the partly regenerated solvent obtained in stage c) so as to obtain a gas phase containing acid gases and the second solvent,
(e) mixing a second fraction of the partly regenerated solvent obtained in stage c) with a fourth solvent drawn off at a point of the distillation column so as to obtain the first solvent, the draw-off point being determined for the proportion by mole of methanol of the first solvent to be higher than that of the second solvent.

The second solvent can contain less than 1% by weight of methanol.

In stage d) of the method, the second solvent can be drawn off from the bottom of the distillation column.

In stage e) of the method, the fourth solvent can be drawn off at a point located between the bottom and the top of the distillation column. In stage e), the fourth solvent can also be drawn off in gaseous form at the top of the distillation column and cooled.

In stage c) of the method, the acid gas-containing solvent obtained in stage a) can be expanded successively to two pressure levels.

The method according to the invention can comprise the following stages
(f) cooling the gas obtained in stage b) so as to obtain a methanol-poor gas, a hydrocarbon-containing liquid phase and a methanol-containing aqueous phase,
(g) prior to stage a), contacting part of the natural gas with the aqueous phase obtained in stage f).

In stage d) of the method, the first fraction of the partly regenerated solvent obtained in stage c) can be expanded, then heated by heat exchange with the second solvent obtained in stage d).

According to the method of the invention, a third fraction of the partly regenerated solvent obtained in stage c) can be fed into the distillation column, the feeding point in the distillation column for the first fraction of the partly regenerated solvent being different from the feeding point of the third fraction of the partly regenerated solvent.

The amine can be selected from the following compounds: diethanolamine (DEA), methyldiethanolamine (MDEA), methylethanolamine (MEA), triethanolamine (TEA), diglycolamine (DGA) and diisopropanolamine (DIPA), and a mixture of these amines.

The method according to the invention can comprise the following stages:
(h) cooling the acid gas-containing gas phase obtained in stage d) so as to obtain a liquid phase and an acid gas-rich gas phase, the liquid phase being separated from the gas phase in a separating drum,
(i) cooling the acid gas-rich gas phase obtained in stage h) and the acid gases released in stage c) so as to obtain a liquid phase and a gas phase,
(j) feeding the liquid phase obtained in stage i) into the separating drum. The operating conditions of the method according to the invention can be as follows:
stages a) and b) are carried out at a temperature ranging between 20° C. and 80° C. and at a pressure ranging between 3 MPa abs. and 10 MPa abs.,
in stage c), the acid gas-containing solvent obtained in stage a) is expanded to a pressure ranging between 0.1 MPa abs. and 1 MPa abs.,
stage d) is carried out at a temperature ranging between 30° C. and 130° C. and at a pressure ranging between 0.1 MPa abs. and 1 MPa abs.

BRIEF DESCRIPTION OF THE FIGURES

Other features and advantages of the invention will be clear from reading the description hereafter, given by way of non limitative example, with reference to the accompanying drawings wherein.

DETAILED DESCRIPTION

Figure 1:
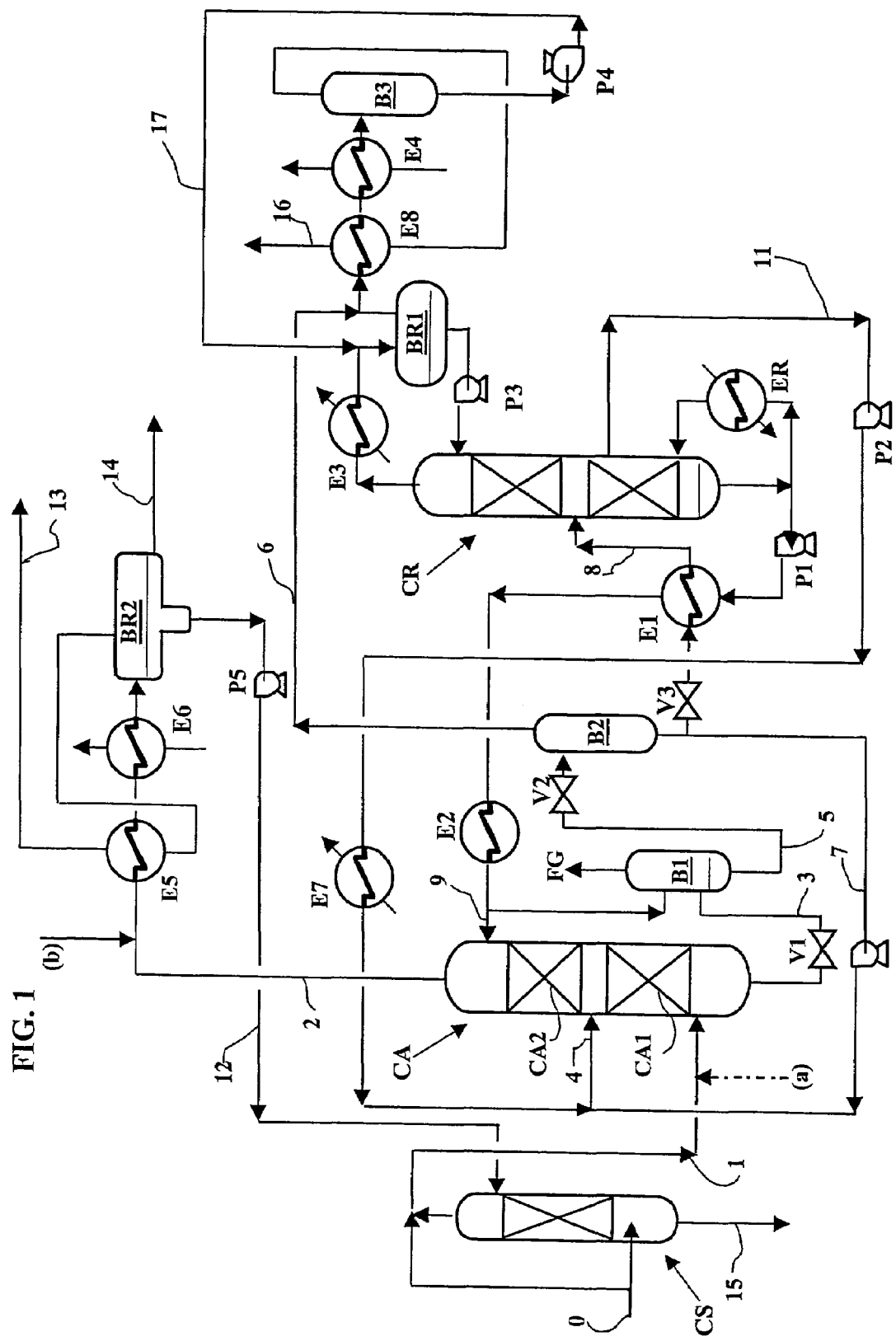
FIG. 1 diagrammatically shows the method according to the invention.

In FIG. 1, the natural gas to be treated flows in through line 0. It contains for example methane, ethane, propane, butane, as well as heavier hydrocarbons, water and acid gases such as, for example, $H_2S$ and $CO_2$, and possibly mercaptans.

A fraction of this gas is sent to contact column CS where it is subjected to countercurrent contact with a methanol solution flowing in through line 12. At the bottom of column CS, an aqueous phase substantially freed from methanol is discharged through line 15. The methanol-containing gas recovered at the top of column CS is mixed with the natural gas that has not flowed through column CS. This gas mixture is sent through line 1 into contact column CA.

Makeup methanol flowing in through line (a) is possibly added to the gas circulating in line 1 prior to sending it to contact column CA. Column CA comprises two absorption sections CA1 and CA2. In first section CA1, the gas flowing in through line 1 is subjected to countercurrent contact with a solvent consisting of a mixture of water, methanol and amine flowing in through line 4. The gas leaving first section CA1 is brought into countercurrent contact in second section CA2 with a solvent consisting of a mixture of water, methanol and amine flowing in through line 9. The methanol content (in % by mole) of the solvent flowing in through line 9 is lower than the methanol content (in % by mole) of the solvent flowing in through line 4. An acid gas-containing solvent is discharged at the bottom of column CA through line 3. A gas substantially freed of the acid gases and containing methanol is recovered at the top of column CA through line 2. Makeup methanol flowing in through line (b) allows the methanol content of the gas circulating in line 2 to be increased.

The gas flowing from column CA through line 2 is cooled in indirect heat exchangers E5 and E6, then sent into separating drum BR2. A gas phase substantially freed of methanol and discharged through line 13 after heat exchange in exchanger E5, a hydrocarbon-containing liquid phase discharged through line 14 and a methanol-containing aqueous phase introduced by means of pump P5 and line 12 into column CS are separated in drum BR2.

The solvent discharged through line 3 is expanded to a first pressure level through valve V1 by releasing a gas phase which contains at least part of the hydrocarbons that may have been co-absorbed in the solvent in column CA. The gas phase and the liquid phase obtained by expansion of the solvent are separated in separating drum B1. The solvent-containing liquid phase is discharged from drum B1 through line 5. The gas phase forms a combustible gas FG commonly referred to as fuel gas. The gas phase is possibly freed of the acid gases it contains by washing in drum B1 with a fraction of the solvent circulating in line 9. Washing can also be carried out in any other suitable system known to the man skilled in the art.

The solvent circulating in line 5 is expanded through expansion valve V2. The acid gases released through expansion are separated from the liquid solvent in separating drum B2. The liquid solvent recovered at the bottom of drum B2 is thus partly regenerated. The acid gases are discharged through line 6. A first part of the liquid solvent is discharged through line 7, then mixed with the solvent circulating in line 11. This solvent mixture is fed through line 4 into column CA. A second part of the liquid solvent is expanded through expansion valve V3, then it flows into exchanger E1 where it is heated by indirect heat exchange and sent through line 8 into regeneration column CR. In column CR, the solvent is regenerated by distillation. Reboiler ER heats the liquid solvent available at the bottom of column CR. Regenerating the first part of the solvent circulating in line 7 only by expansion allows to limit the amount of solvent treated by column CR, and consequently to limit the energy required for regeneration of the solvent from column CA.

The regenerated solvent, i.e. substantially free of acid gases (the acid gas content can be less than 1% by mole), is recovered at the bottom of column CR. The regenerated solvent is cooled by indirect heat exchange with the solvent circulating in line 8 in exchanger E1, then cooled in exchanger E2, and fed into column CA through line 9.

Line 11 draws off a solvent at an intermediate point of column CR, i.e. at a point located above the point of draw-off of the regenerated solvent through line 9. The solvent circulating in line 11 is pumped by pump P2, cooled in exchanger E7, mixed with the solvent circulating in line 7. This solvent mixture is fed through line 4 into column CA. The position of the draw-off point of line 11 on column CR depends on the composition of the solvent to be fed into column CA through line 4. The closer the draw-off point to the top of column CR, the richer in methanol the solvent circulating in line 11. The composition of the solvent fed through line 4 into column CA can thus be adjusted according to the position of the draw-off point of line 11 on column CR. Furthermore, draw-off a methanol-rich solvent from regeneration column CR allows to increase the amine concentration of the solvent drawn off at the bottom of column CR. In fact, the amount of methanol contained in the solvent drawn off at an intermediate point through line 11 will not be contained in the solvent drawn off through line 9.

It has also been discovered that it is possible, by means of the method according to the invention, to obtain at the bottom of regeneration column CR a solvent having a very low methanol content. Under such conditions, a gas substantially free of methanol is obtained at the top of absorption column CA. This treated gas requires no cooling treatment to recover the methanol it contains. For example, it is possible to obtain at the bottom of column CR a regenerated solvent containing less than 1% by weight of methanol. The methanol thus separated from the solvent is discharged at the top of the regeneration column and sent to the top of first absorption section CA1 through lines 11 and 4. Such a separation requires a temperature and a pressure allowing to reboil a liquid consisting of amine and substantially free of methanol. For example, if the pressure of column CR is close to the atmospheric pressure, i.e. between 0.1 MPa and 1 MPa abs., the temperature at the bottom of column CR can range between 110° C and 130° C.

The vapor phase discharged at the top of regeneration column CR is cooled in condenser E3. After cooling, the methanol-rich liquid phase is separated from the acid gases in drum BR1. The methanol-rich liquid phase is sent to the top of column CR by means of pump P3. The acid gases from drum BR1 are mixed with the acid gases circulating in line 6. The acid gas mixture is cooled in exchangers E8 and E4, then fed into drum B3. The methanol-rich liquid phase obtained at the bottom of drum B3 is fed into drum BR1 by means of pump P4 and line 17. The acid gases obtained at the top of drum B3 are heated in exchanger E8 by heat exchange with the acid gas mixture from drum BR1 and line 6, then discharged through line 16. The acid gases discharged through line 16 can be liquefied and injected into the subsoil, for example in an oil well.

The method according to the invention allows on the one hand to regenerate part of the solvent by simple expansion, which is economical, and on the other to adjust the methanol contents in the two absorption sections CA1 and CA2. The method according to the invention thus allows to treat a highly acid gas because, during stage a), the first methanol-rich solvent allows to absorb most of the acid gases and, during stage b), the amine-rich solvent allows to absorb the remaining acid gases.

An example of implementation of the method according to the invention as defined above is given hereafter in connection with FIG. 1. The gas is fed through line 0 at a temperature of 45° C. and an absolute pressure of 7.6 MPa with the following composition (in % by mole):

| | |
|---|---|
| $H_2O$ | 0.14% |
| $N_2$ | 1.09% |
| $CO_2$ | 3.84% |
| $H_2S$ | 21.78% |
| $C_1$ | 52.85% |
| $C_2$ | 11.40% |
| $C_3$ | 6.00% |
| $iC_4$ | 0.82% |
| $C_4$ | 1.61% |
| $C_5$ | 0.33% |
| $C_{6+}$ | 0.11% |
| RSH | 0.03% |

In column CS, the gas is contacted with the aqueous methanol solution flowing in through line 12 and flows out of column CS charged with methanol. It is then fed into absorption column CA.

After washing with a methanol-rich solvent flowing in through line 4 at the top of section CA1, this gas is washed with a diethanolamine (DEA) rich solvent flowing in through line 9 at the top of section CA2. The gas flows out free of its acid gases and it is cooled to −30° C. in exchangers E5 and E6 after addition of methanol through line (b). A deacidified, dehydrated and stripped gas phase discharged through line 13, a liquid hydrocarbon phase discharged through line 14 and a methanol-containing aqueous phase discharged through line 12 to column CS to recover the methanol by stripping with a fraction of the gas flowing in through line 0 are recovered in three-phase drum BR2. A methanol-poor aqueous phase (98.91% by mole of $H_2O$) is discharged through line 15 at the bottom of column CS.

The treated gas discharged through line 13 contains 4.4 ppm $H_2S$ and 2.9 ppm $CO_2$.

The acid gas-containing solvent recovered at the bottom of column CA is expanded to 2.6 MPa abs. to release the co-absorbed hydrocarbons. The latter are washed in drum B1 by a fraction of regenerated solvent from line 9. The solvent freed from the dissolved hydrocarbons circulating in line 5 is expanded to an absolute pressure of 0.4 MPa through valve V2 to release part of the dissolved acid gases which are sent to the top of column CR through line 6. A fraction of the partly regenerated solvent is sent to the top of the first section of CA1 through line 7 and the other fraction is sent to regeneration column CR after expansion to 0.24 MPa abs. through valve V3, then heating in exchanger E1. A flow of regenerated solvent with a low methanol concentration (11.40% by mole) is recovered at the bottom of column CR and sent to the top of column CA. A fraction of solvent with a high methanol concentration (19.93% by mole) is drawn off from column CR through line 11 and sent with the solvent circulating in line 7 to the top of the lower section of CA1 after cooling by E7. The draw-off point of line 11 is located between the bottom of column CR and the feeding point of column CR through line 8.

The solvent sent to the top of absorption column CA through line 9 contains 0.26% $H_2S$ and 0.08% $CO_2$ in molar fraction. The solvent discharged from separating drum B1 and sent to the absorption column through line 7 contains 1.93% $CO_2$ and 4.44% $H_2S$ in molar fraction.

Finally, the acid gases at the top of regeneration column CR containing methanol and water are cooled to ambient temperature by exchanger E3 to generate a reflux sent to column CR by pump P3. The acid gases at the outlet of BR1 are cooled in E8 and E4. The methanol fraction they contain is recycled to BR1 and the acid gases are discharged through line 16 after heating in exchanger E8.

Figure 2:
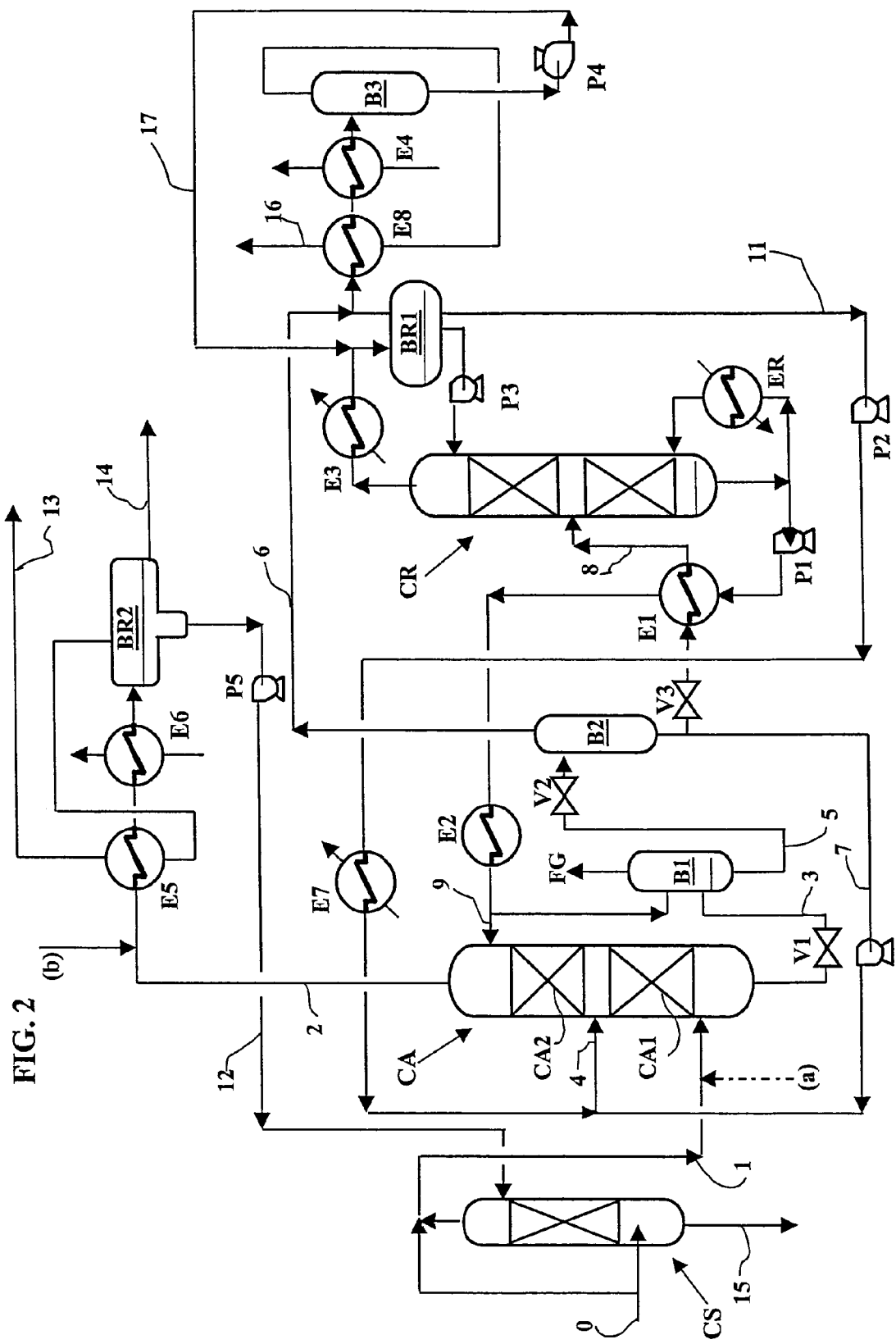
FIGS. 2 and 3 diagrammatically show variants of the method according to the invention.
Figure 3:
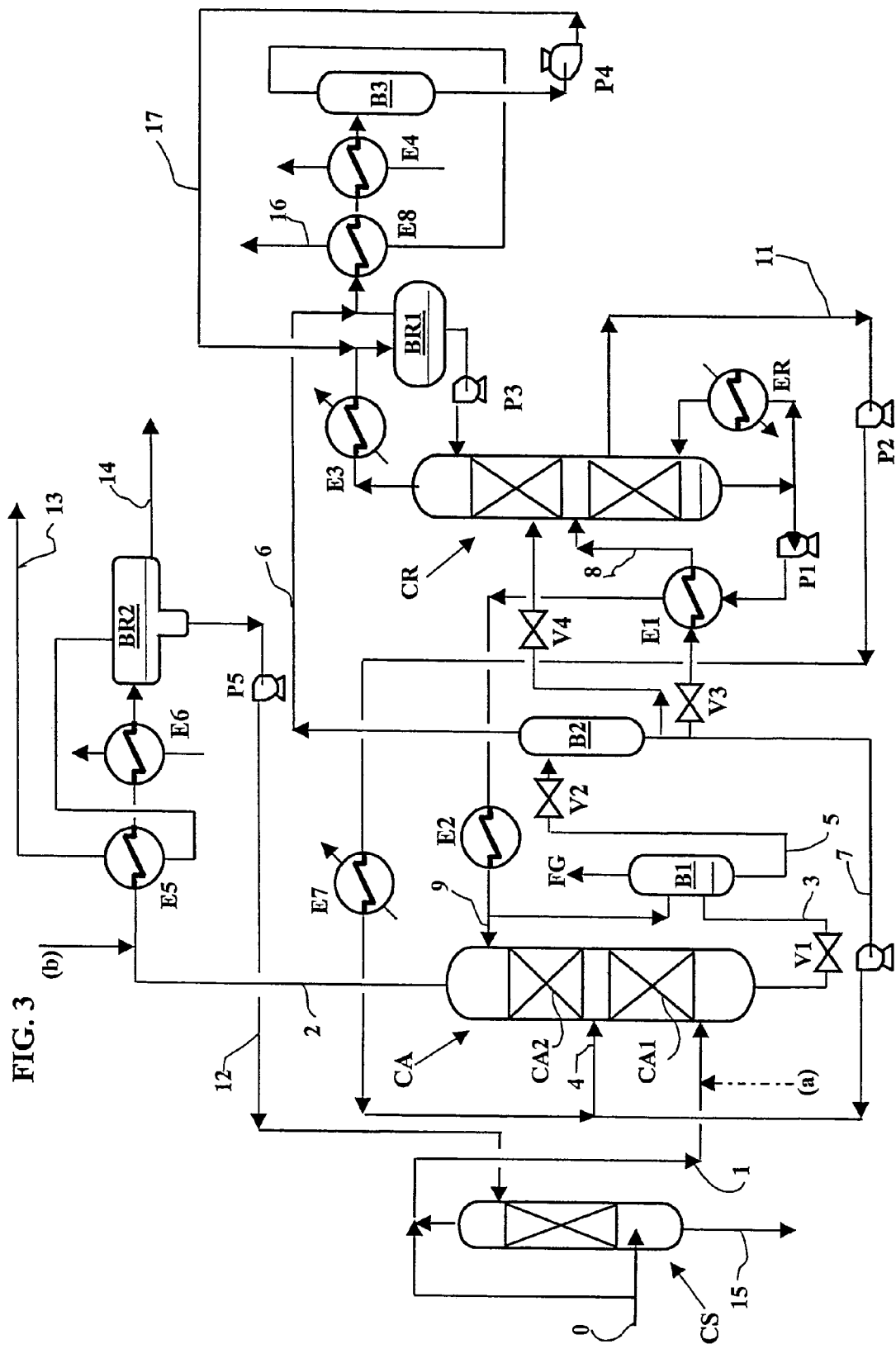

The elements of FIGS. 2 and 3 having the same reference numbers as the elements of FIG. 1 are identical thereto.

In FIG. 2, in relation to FIG. 1, the draw-off point of line 11 has been modified. Line 11 draws off a fraction of the methanol-rich liquid phase obtained in drum BR1. This fraction is mixed with the solvent circulating in line 7, the mixture being introduced at the top of absorption section CA1.

In FIG. 3, in relation to FIG. 1, the liquid solvent from drum B2 is separated into three parts. A first part of the solvent is mixed with the solvent circulating in line 11, the mixture being introduced at the top of absorption section CA1. A second part of the solvent is expanded through valve V3, then exchanges heat in E1 with the regenerated solvent circulating in line 9, then it is fed into column CR. A third part of the solvent is expanded through valve V4, then fed into column CR at a level located above the level of introduction of the second part of the solvent in column CR.

Absorption column CA and regeneration column CR can be plate or packed columns. Various types of plates and/or packings, random or stacked, can be used.

Heat exchangers E1 to E8 can be plate or shell-and-tube exchangers, made of brazed aluminium or stainless steel.

Without departing from the scope of the invention, regeneration can be carried out in two or more distillation columns working under different pressure and temperature conditions. It is thus possible, for example, to obtain acid gas fractions with different compositions, for example a $CO_2$-concentrated fraction and an $H_2S$-concentrated fraction.

Various amines can be used in the method according to the invention. It is notably possible to use secondary amines such as diethanolamine (DEA) or tertiary amines such as methyldiethanolamine (MDEA). It is possible to use these amines pure or in admixture. It is also possible to add various additives intended to limit degradation of the amine by oxidation or to limit foaming.

It is advantageous to use an $H_2S$ selective amine. The $CO_2$ contained in the mixture of solvents is thus separated upon expansion through valves V1 and V2. The $H_2S$ is separated from the mixture of solvents during a stage of regeneration by distillation.

The invention claimed is:
1. A method of deacidizing a natural gas containing acid gases wherein the following stages are carried out:
   (a) contacting the natural gas with a first solvent containing methanol, water and an amine, obtained in stage e), and with a third solvent containing acid gases obtained in stage b) so as to obtain a methanol-containing gas and an acid gas-containing solvent,
   (b) contacting the gas obtained in stage a) with a second solvent containing methanol, water and an amine, obtained in stage d), so as to obtain a gas partly freed of acid gases and the third solvent containing acid gas, (c) expanding the acid gas-containing solvent obtained in stage a) so as to release acid gases and to obtain a partly regenerated solvent, (d) distilling in a distillation column a first fraction of the partly regenerated solvent obtained in stage c) so as to obtain a gas phase containing acid gases and the second solvent, (e) mixing a second fraction of the partly regenerated solvent obtained in stage c) with a fourth solvent drawn off at a point of the distillation column located between the bottom and the top of the distillation column so as to obtain the first solvent, the draw-off point being determined for the proportion by mole of methanol of the first solvent to be higher than that of the second solvent.

2. A method as claimed in claim 4, wherein the second solvent contains less than 1% by weight of methanol.

3. A method as claimed in claim 1, wherein, in stage c), the acid gas-containing solvent obtained in stage a) is progressively expanded to two pressure levels.

4. A method as claimed in claim 1, further comprising:

(f) cooling the gas obtained in stage b) so as to obtain a methanol-poor gas, a hydrocarbon-containing liquid phase and a methanol-containing aqueous phase, (g) prior to stage a), contacting part of the natural gas with the aqueous phase obtained in stage f).

5. A method as claimed in claim 1, wherein, before stage d), the first fraction of the partly regenerated solvent obtained in stage c) is expanded, then heated by heat exchange with the second solvent obtained in stage d).

6. A method as claimed in claim 1, wherein a third fraction of the partly regenerated solvent obtained in stage c) is fed into the distillation column, the point of introduction in the distillation column of the first fraction of the partly regenerated solvent being different from the point of introduction in the distillation column of the third fraction of the partly regenerated solvent.

7. A method as claimed in claim 1, wherein the amine is selected from the compounds diethanolamine, methyldiethanolamine, methylethanolamine, triethanolamine, diglycolamine and diisopropanolamine.

8. A method as claimed in claim 4, further comprising:

(h) cooling the acid gas-containing gas phase obtained in stage d) so as to obtain a liquid phase and an acid gas-rich gas phase, the liquid phase being separated from the gas phase in a separating drum, (i) cooling the acid gas-rich gas phase obtained in stage h) and the acid gases released in stage c) so as to obtain a liquid phase and a gas phase, (j) feeding the liquid phase obtained in stage i) into the separating drum.

9. A method as claimed in claim 1, wherein stages a) and b) are carried out at a temperature ranging between 20° C. and 80° C. and at a pressure ranging between 3 MPa abs. and 10 MPa abs., in stage c), the acid gas-containing solvent obtained in stage a) is expanded to a pressure ranging between 0.1 MPa abs. and 1 MPa abs., and stage d) is carried out at a temperature ranging between 30° C. and 130° C. and at a pressure ranging between 0.1 MPa abs. and 1 MPa abs.

10. A method as claimed in claim 1, further comprising:

(f) cooling the acid gas-containing gas phase obtained in stage d) so as to obtain a liquid phase and an acid gas-rich gas phase, the liquid phase being separated from the gas phase in a separating drum, (g) cooling the acid gas-rich gas phase obtained in stage f) and the acid gases released in stage c) so as to obtain a liquid phase and a gas phase, (h) feeding the liquid phase obtained in stage g) into the separating drum.

* * * * *